United States Patent
Krum et al.

(10) Patent No.: US 10,915,334 B2
(45) Date of Patent: Feb. 9, 2021

(54) ENFORCEMENT OF ROLE-BASED CONSTRAINTS ON THE MODIFICATION OF COMPONENTS OF A MULTI-USER AWARE COMPUTING DEVICE

(71) Applicant: Microsoft Technology Licensing, LLC, Redmond, WA (US)

(72) Inventors: Kyle J. Krum, Sammamish, WA (US); Stephen F. Starck, Redmond, WA (US); Kerwin Almer M. Azares, Redmond, WA (US); Tyler Jeffrey White, Seattle, WA (US); Kurt Allen Geisel, Redmond, WA (US); Carson J. Hicks, Seattle, WA (US); Gargee Sharma, Redmond, WA (US); Peter G. Davis, Kirkland, WA (US); Raju Jain, Kirkland, WA (US); Kolby Hoover, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 16/107,137

(22) Filed: Aug. 21, 2018

(65) Prior Publication Data
US 2020/0065117 A1 Feb. 27, 2020

(51) Int. Cl.
*G06F 1/24* (2006.01)
*G06F 9/00* (2006.01)
(Continued)

(52) U.S. Cl.
CPC ............ *G06F 9/4451* (2013.01); *G06F 21/31* (2013.01); *G06F 21/6218* (2013.01)

(58) Field of Classification Search
CPC .... G06F 9/4451; G06F 21/31; G06F 21/6218; G06F 9/468
See application file for complete search history.

(56) References Cited

U.S. PATENT DOCUMENTS 9,503,440 B2   11/2016 Kunz et al.
10,354,542 B2 * 7/2019 Kapoor .................... G09B 7/00
(Continued)

OTHER PUBLICATIONS

"International Search Report and Written Opinion Issued in PCT Application No. PCT/US2019/038828", dated Sep. 16, 2019, 10 Pages.

(Continued)

*Primary Examiner* — Xuxing Chen
(74) *Attorney, Agent, or Firm* — Newport IP, LLC; Scott Y. Shigeta

(57) ABSTRACT

A multi-user aware ("MUA") computing device, such a communal computing device like an interactive digital whiteboard, can enforce role-based constraints on the modification of components, such as configuration settings. The MUA computing device can be configured with universal settings, global settings, and temporal settings. Universal settings cannot be changed by users of the MUA computing device. Device owners can change global settings that apply to all users of a MUA computing device. All users of the MUA computing device can change temporal settings. Changes to temporal settings are stored in profiles associated with authenticated users but are not persisted for guest users. When all users have stopped using the MUA computing device, the device can be configured with default values for the temporal settings in order to return the device to a known state.

20 Claims, 12 Drawing Sheets

(51) Int. Cl.
*G06F 9/445* (2018.01)
*G06F 21/31* (2013.01)
*G06F 21/62* (2013.01)

(56) References Cited

U.S. PATENT DOCUMENTS

| | | | |
|---|---|---|---|
| 2006/0050303 A1* | 3/2006 | Oomori | H04N 1/32037 358/1.15 |
| 2011/0185437 A1 | 7/2011 | Tran et al. | |
| 2013/0091562 A1* | 4/2013 | Matsuzawa | G06F 21/604 726/17 |
| 2016/0087956 A1* | 3/2016 | Maheshwari | H04L 47/125 726/6 |
| 2017/0180132 A1 | 6/2017 | Osborne et al. | |

OTHER PUBLICATIONS

"E-Security Begins with Sound Security Policies", In Symantec Enterprise Security, Jun. 14, 2001, 23 Pages.
"How to Manage User Device Affinity in Configuration Manager", Retrieved from: https://technet.microsoft.com/en-in/library/gg699365.aspx, May 14, 2015, 7 Pages.
"Shared Devices Overview", Retrieved from: https://my.air-watch.com/help/9.1/en/Content/Core_Guides/MDM/C/Shared-DevicesOverview.htm, Retrieved on Mar. 12, 2018, 3 Pages.
"Supporting Multiple Users", Retrieved from: https://web.archive.org/web/20170710164818/https://source.android.com/devices/tech/admin/multi-user, Jul. 10, 2017, 5 Pages.
Ratazzi, et al., "A Systematic Security Evaluation of Android's Multi-User Framework", In Journal of Computing Research Repository, Oct. 2014, pp. 1-10.
Vilcinskas, et al., "Managing devices using the Azure portal", Retrieved from: https://docs.microsoft.com/en-us/azure/active-directory/device-management-azure-portal, Jun. 1, 2018, 14 Page.

* cited by examiner

ENFORCEMENT OF ROLE-BASED CONSTRAINTS ON THE MODIFICATION OF COMPONENTS OF A MULTI-USER AWARE COMPUTING DEVICE

BACKGROUND

Computing devices supporting multiple simultaneous users ("multi-user aware computing devices" or "MUA computing devices") are commonly utilized in the workplace and other types of environments. For example, a communal computing device, such as an interactive digital whiteboard, might be installed in a conference room of an enterprise. Employees of the enterprise can utilize the communal computing device individually or in collaboration with one another.

MUA computing devices might be utilized throughout the day by several categories and types of users. For instance, users with the proper credentials can authenticate with a MUA computing device to access its functionality. If a user does not have access credentials or if the device cannot authenticate a user, the user might be permitted to use the device as a "guest" to access a limited subset of the device's functionality. Multiple authenticated users and guest users can utilize such a device at the same time.

When different categories and types of users utilize a MUA computing device, conflicts can arise with respect to the configuration settings of the device. For example, a hearing-impaired user might increase the output volume of a device significantly. In this case, the output volume might be much too loud for a subsequent user of the device. As another example, an authenticated user might have an associated user profile that stores data defining their preferences for certain configuration settings. Some of these configuration settings, however, might be inappropriate for use on a shared computing device: a user's desktop background image, for example.

Many types of other conflicts between configuration settings can occur when multiple authenticated users, each having their own user profile, access a MUA computing device simultaneously. These conflicts can be confusing to users and, as a result, can utilize computing resources of such a device unnecessarily. For instance, a user might be confused as to why a configuration setting made during one session with a device was not retained during a subsequent session with the same device. This can cause unnecessary user interaction with a MUA computing device, such as when a user must navigate various user interfaces ("UIs") to change a conflicting configuration setting to their preferred setting. Users might also spend time interacting with other UIs to modify a configuration setting or to determine why a preferred configuration setting was not used by a MUA computing device. This type of user interaction with a MUA computing device can result in the unnecessary utilization of computing resources, such as memory and processor cycles, as compared to previous MUA computing devices.

It is with respect to these and other technical challenges that the disclosure made herein is presented.

SUMMARY

Technologies are disclosed herein for enforcement of role-based constraints on the modification of components of a MUA computing device. Implementations of the technologies disclosed herein can reduce the utilization of computing resources, such as memory and processor cycles, as compared to previous MUA computing devices by applying configuration settings in a predictable manner to avoid conflicting configuration settings and by limiting the configuration settings that can be modified by users based upon their roles. Other technical benefits not specifically identified herein can also be realized through implementations of the disclosed technologies. Technical benefits not specifically discussed herein can also be realized through implementations of the disclosed subject matter.

In order to realize the technical benefits mentioned briefly above, and potentially others, a MUA computing device, such a communal computing device like an interactive digital whiteboard, is configured for enforcement of role-based constraints on the modification of components, such as configuration settings for the device. In order to provide this functionality, roles can be assigned to users such as, but not limited to, authenticated non-device-owner users ("authenticated users"), non-authenticated users ("guests" or "guest users"), and authenticated device owner users ("device owners").

As will be described in greater detail below, a MUA computing device can be configured with settings, referred to herein as "universal settings," that apply to all users of the device. The universal settings and their values can be defined by policy set, for example, by a member of a corporate IT department or a legal owner of the MUA computing device such as a small business owner.

Policy might also define "temporal settings" for a MUA computing device. Temporal settings are settings that can be temporarily modified by guests and authenticated users of a MUA computing device. Changes to the temporal settings can be persisted to a user profile for authenticated users. Changes to the temporal settings will not be persisted to a user profile for non-authenticated users (i.e. guests) of a MUA computing device.

A user having a role of device owner can also specify values for configuration settings for a MUA computing device that cannot be modified by non-device-owner users. An appropriate user interface ("UI"), or UIs, can be provided to enable a device owner to change values for these settings, which are referred to herein as "global settings."

Once a MUA computing device has been configured with the configuration settings described above, a MUA computing device can enforce the utilization and modification of the configuration settings based upon user roles. For example, a MUA computing device might be configured with universal settings, global settings, and temporal settings upon its initialization (e.g. powering on or rebooting). The device might then utilize various mechanisms, some of which are described below, to detect that a user is in its vicinity. If a user is detected in the vicinity of the device, the MUA computing device might consider the user to have the role of a guest user and enable the guest to utilize certain, typically limited, aspects of its functionality.

A guest user will be permitted to modify temporal settings of the MUA computing device (e.g. change the volume or screen brightness, turn on accessibility features, or change network settings). In some configurations, a UI can be provided that shows guest users only those settings that they are permitted to modify. Changes to temporal settings made by a guest user will not be persisted to an online user profile.

Continuing this example, a guest user might subsequently authenticate with the MUA computing device such as, for instance, by providing a password or fingerprint. Values for some or all of the temporal settings (e.g. accessibility settings) can then be set based upon values retrieved from a profile associated with the user. As discussed above, the MUA computing device can provide a UI that shows authenticated non-device-owner users only those settings that they are permitted to modify. Changes to temporal settings made by an authenticated non-device-owner can be persisted to the user's profile.

The MUA computing device might subsequently determine that all users have stopped using the device. If so, the temporal settings for the MUA computing device can be restored to default values.

It is to be appreciated that while the configurations described herein are primarily presented in the context of enforcing the modification of configuration settings of a MUA computing device based upon user roles, the technologies disclosed herein can be utilized to enforce the modification of other types of components based on user roles in other configurations. For example, the disclosed technologies might be utilized to enforce the modification of executable software components or data.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
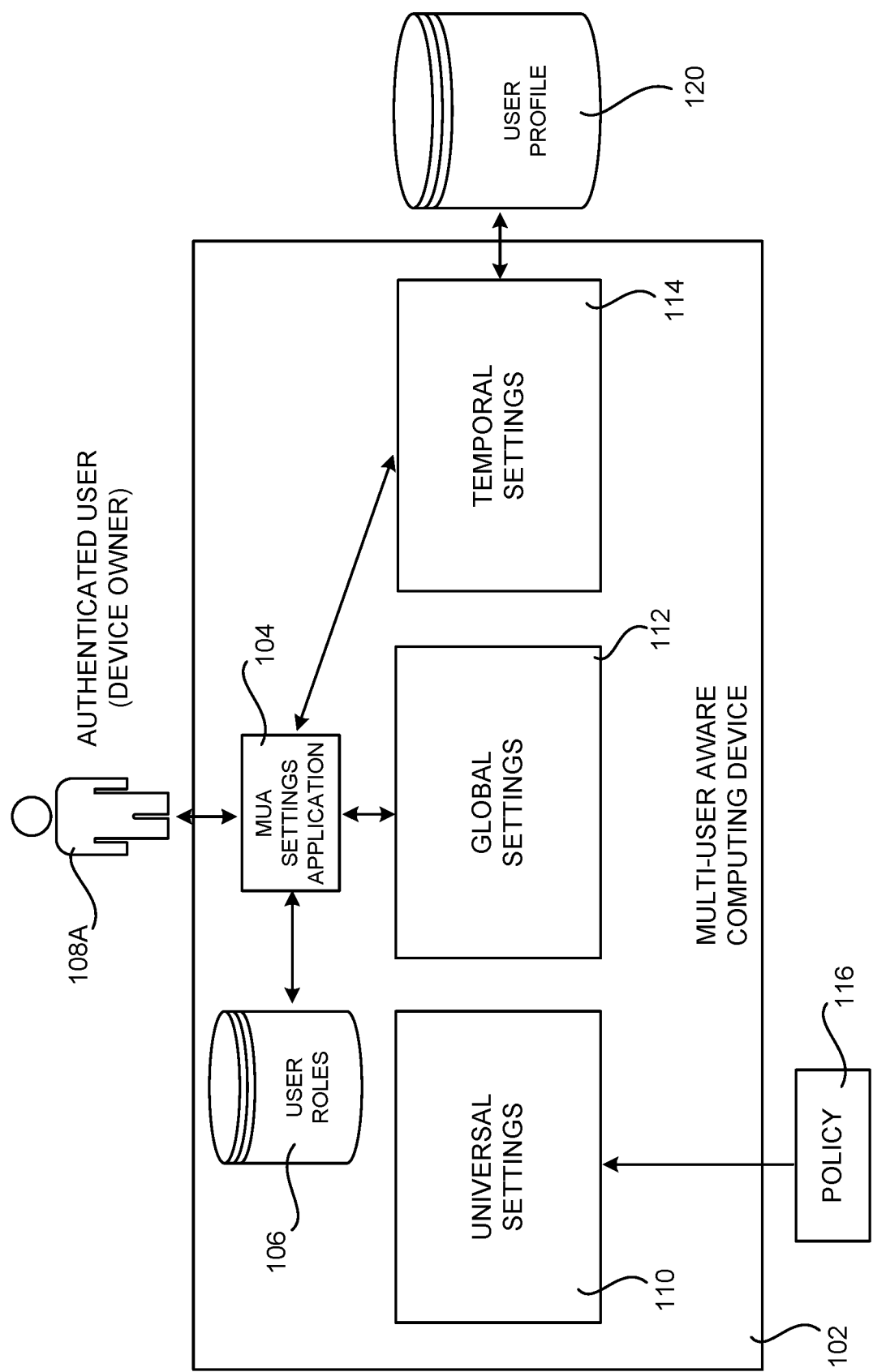
FIGS. 1A-1C are computing architecture diagrams showing aspects of a MUA computing device configured for enforcement of role-based constraints on the modification of components.

The following detailed description is directed to technologies for enforcement of role-based constraints on the modification of components of a MUA computing device. As discussed briefly above, the disclosed technologies can reduce the utilization of computing resources, such as memory and processor cycles, as compared to previous MUA computing devices by applying configuration settings in a predictable and consistent manner to avoid conflicting configuration settings and by limiting the configuration settings that can be modified by users based upon their roles. As a result, implementations of the disclosed technologies can save computing resources as compared to previous MUA computing devices. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of a MUA computing device configured for executing applications in user contexts associated with multiple authenticated users simultaneously will be described.

Figure 1B:
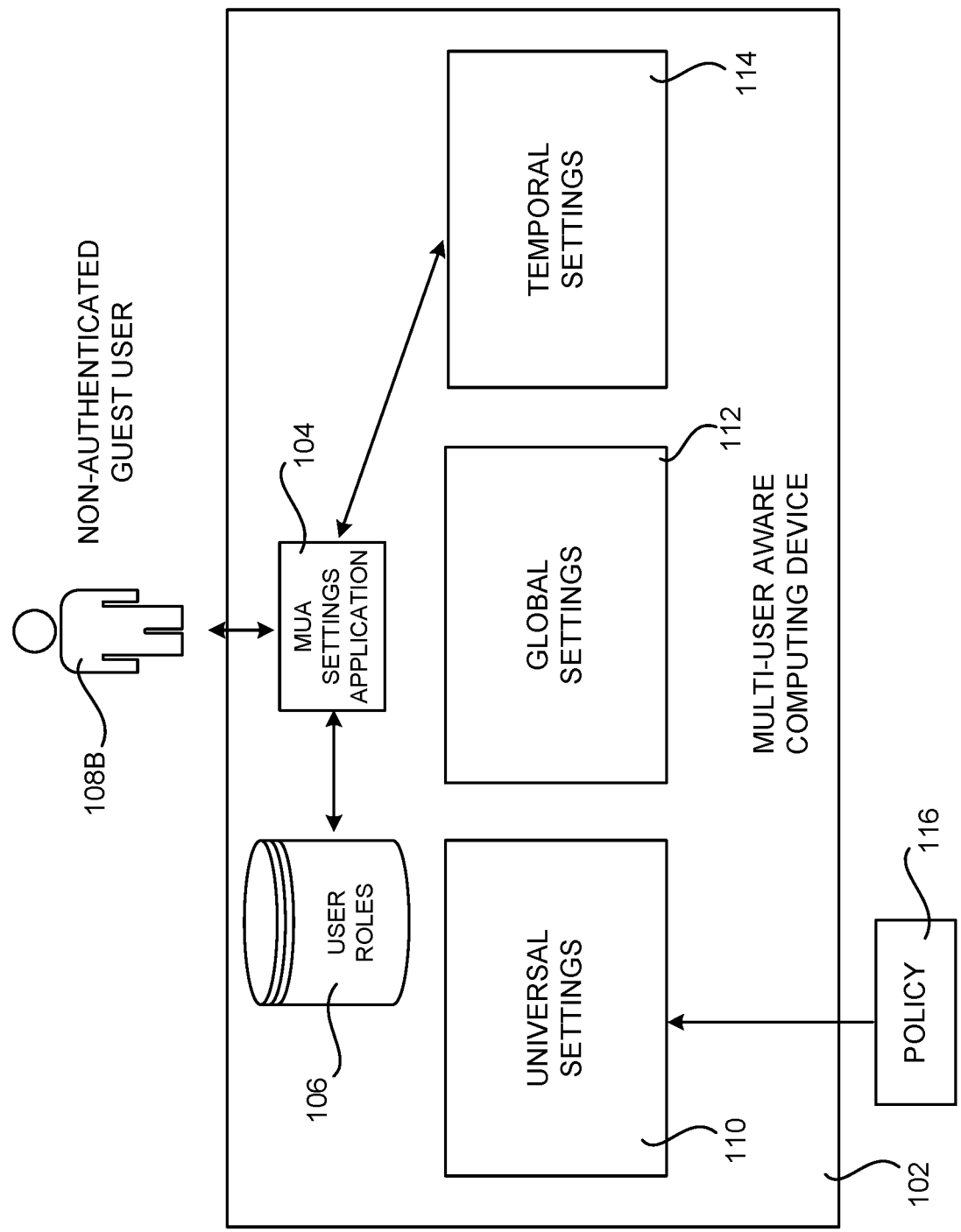
Figure 1C:
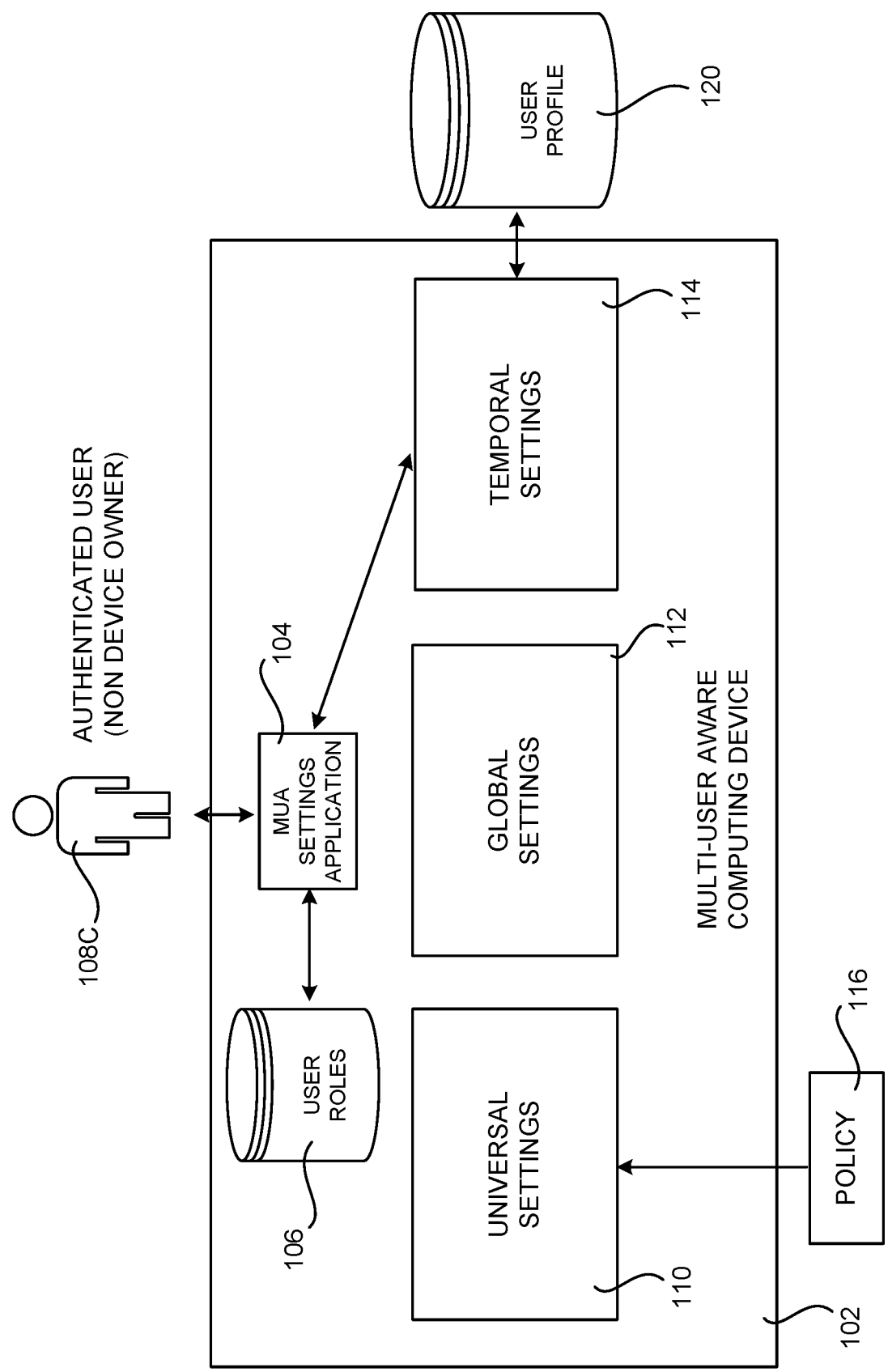

FIGS. 1A-1C are computing architecture diagrams showing aspects of a MUA computing device 102 configured for enforcement of role-based constraints on the modification of components, such as configuration settings. As mentioned above, while the configurations described herein are primarily presented in the context of enforcing the modification of configuration settings used by a MUA computing device 102 based upon user roles, the technologies disclosed herein can be utilized to enforce the modification of other types of components based on user roles in other configurations. For example, the disclosed technologies might be utilized to enforce the modification of executable software components or other types of data in other configurations.

The MUA computing device 102 might be a communal computing device such as the interactive digital whiteboard shown in FIGS. 2A-2E and described below. In this regard, it is to be appreciated that while an interactive digital whiteboard is utilized herein to illustrate aspects of the disclosed subject matter, those skilled in the art will recognize that the disclosed technologies can be implemented by other types of MUA computing devices 102 including, but not limited to, hand-held computing devices, consumer electronics, wearable computing devices, automobiles, home automation devices, video game consoles, desktop and laptop computers, tablet computers, and the like.

As shown in FIG. 1A and described briefly above, the MUA computing device 102 is configured for enforcement of role-based constraints on the modification of components, such as configuration settings for the device 102. In order to provide this functionality, user roles 106 can be assigned to users 108 such as, but not limited to, authenticated users (i.e. users 108 that have authenticated with the device 102 but are not device owners), guest users (i.e. users 108 that have not authenticated with the device 102), and device owners (i.e. authenticated users 108 that have been assigned the role of device owner). The user 108A shown in FIG. 1A has been assigned the role of device owner and, accordingly, might be referred to as the "device owner 108A."

As discussed briefly above, the MUA computing device 102 can be configured with settings, referred to herein as "universal settings 110," that apply to all users of the device 102. The universal settings 110 and their values can be defined by a policy 116 set, for example, by a member of a corporate IT department or a legal owner of the MUA computing device such as a small business owner. The universal settings 110 cannot be changed by device owners 108A, authenticated users, or guest users. The policy 116 can be set at manufacture or runtime time of the device 102 and can be changed periodically. The policy 116 can also be set on a per-device basis and can be set differently for different device types (e.g. the device 102 might have a different policy 116 than a desktop or laptop computer or a smartphone).

Policy might also specify "temporal settings 114" for a MUA computing device 102. Temporal settings 114 are settings that can be temporarily modified by guests and authenticated users of a MUA computing device 102. Temporal settings 114 might include, for example, volume, brightness, accessibility settings like narration or magnifying glass functionality, and UI language.

Changes to the temporal settings 114 made on the MUA computing device 102 can be persisted to a user profile 120 for authenticated users. Changes to the temporal settings 114 will not be persisted to a user profile 120 for non-authenticated users (i.e. guests) of a MUA computing device 102.

Default values for the temporal settings 114 can be applied to the device 102 to return the device 102 to a known state at certain points in time, such as at initialization of the device 102, or when all users 108 have completed their use of the device 102. In this manner, guest users are presented with a device 102 in the same configuration each time they use the device 102.

The policy can also specify global settings 112. Device owners, such as the device owner 108A, can specify values for the global settings 112 for the MUA computing device 102. The global settings 112 cannot be modified by authenticated non-device-owner users or by guest users of the device 102.

In some configurations, the MUA computing device 102 executes a MUA settings application 104 through which the device owner 108A can specify configuration settings for the MUA computing device 102. In particular, the MUA settings application 104 can provide a UI, or UIs, (not shown in FIG. 1A) that enables the device owner 108A to change values for the global settings 112.

The device owner 108A can also utilize the MUA settings application 104 to change temporal settings 114. Changes to the temporal settings 114 made by a device owner 108A will be saved to a user profile 120 associated with the device owner 108A. One illustrative UI for enabling a device owner 108A to set both global settings 112 and temporal settings 114 are described below with reference to FIGS. 2D and 2E.

Once the device owner 108A has specified the global settings 112 described above, the MUA computing device 102 can be configured with the universal settings 110, global settings 112, and temporal settings 114 such as, for example, at boot time of the MUA computing device 102.

The MUA computing device 102 can also enforce the ability of users 108 to modify the configuration settings described above based upon the roles 106 of the users 108. For example, and as shown in FIG. 1B, a guest user 108B can utilize the MUA settings application 104 to change only the temporal settings 114. The guest user 108B cannot change the global settings 112 or the universal settings 110.

If the guest user 108B tries to modify a configuration setting of the device 102 (e.g. change the volume or screen brightness, turn on accessibility features, or change network settings) such as, for example, by using the MUA settings application 104 or a hardware button, the device 102 can determine if the configuration setting is a temporal setting 114. The request to change a configuration setting of the device 102 will be permitted if the configuration setting is a temporal setting 114 (e.g. volume, screen brightness, or accessibility features) and denied if the configuration setting is a global setting 112 or a universal setting 110. In some configurations, the MUA settings application 104 shows a UI to guest users 108B that identifies only those settings that the guest user 108B is authorized to modify.

If the guest user 108B subsequently ends their usage of the MUA computing device 102 (e.g. the user 108B walks away from the device 102), the MUA computing device 102 can be configured with default values for the temporal settings 114 to return the device 102 to a known configuration for the next user of the device 102.

Continuing this example, the guest user 108B might subsequently authenticate with the MUA computing device 102 such as, for instance, by providing a password or fingerprint. The guest user 108B then becomes an authenticated user 108C, shown in FIG. 1C. As mentioned above, values for some or all of the temporal settings 114 (e.g. accessibility settings) might be retrieved from a user profile 120 associated with the authenticated user 108C.

Continuing this example, an authenticated user 108C might subsequently request to modify one of the configuration settings (e.g. request to change volume, brightness, accessibility settings, or network settings) of the MUA computing device 102 such as, for example, by using the MUA settings application 104 or a hardware button. If the authenticated user 108C tries to modify a configuration setting of the device 102, the device 102 can determine if the configuration setting is a temporal setting 114.

The request by a non-device-owner authenticated user 108C to change the configuration of the device 102 will be permitted if the configuration setting is a temporal setting 114 (e.g. volume, brightness or accessibility features) and denied if the configuration setting is not a temporal setting 114 (e.g. network settings). Changes made by an authenticated user 108C to temporal settings 114 can be persisted to the user's profile 120.

The MUA computing device 102 might subsequently determine that all users 108 have stopped using the device 102, such as through the use of facial recognition or a three-dimensional depth camera. If so, default values for the temporal settings 114 can be applied in order to return the device 102 to a known state. Additional details regarding these aspects of the disclosed technologies will be described below with regard to FIGS. 1A-3B.

FIGS. 2A-2E are pictorial diagrams showing aspects of an illustrative MUA computing device 102 and the functionality that it provides. In the example illustrated in FIGS. 2A-2E, the MUA computing device 102 is an interactive digital whiteboard 200. The illustrative interactive digital whiteboard 200 shown in FIGS. 2A-2E includes a roller-stand-mounted display 202A and four wall-mounted displays 202B-202E. The interactive digital whiteboard 200 also includes three video cameras 204A-204C. The video cameras 204A-204C can be utilized to recognize users 108 in the vicinity of the interactive digital whiteboard 200, for videoconferencing, and for other purposes.

The interactive digital whiteboard 200 also includes a computer 206, which might be interfaced to various hardware components such as, but not limited to, a microphone array, ambient light and infrared presence sensors, fingerprint sensors, the displays 202A-202E, the video cameras 204A-204C, wired and wireless networking devices, and other input devices and hardware components. The computer 206 also includes one or more general-purpose processors, graphics processors, memory, and volatile and nonvolatile storage devices. The computer 206 can support execution of a MUA operating system platform to provide aspects of the functionality disclosed herein.

Figure 2A:
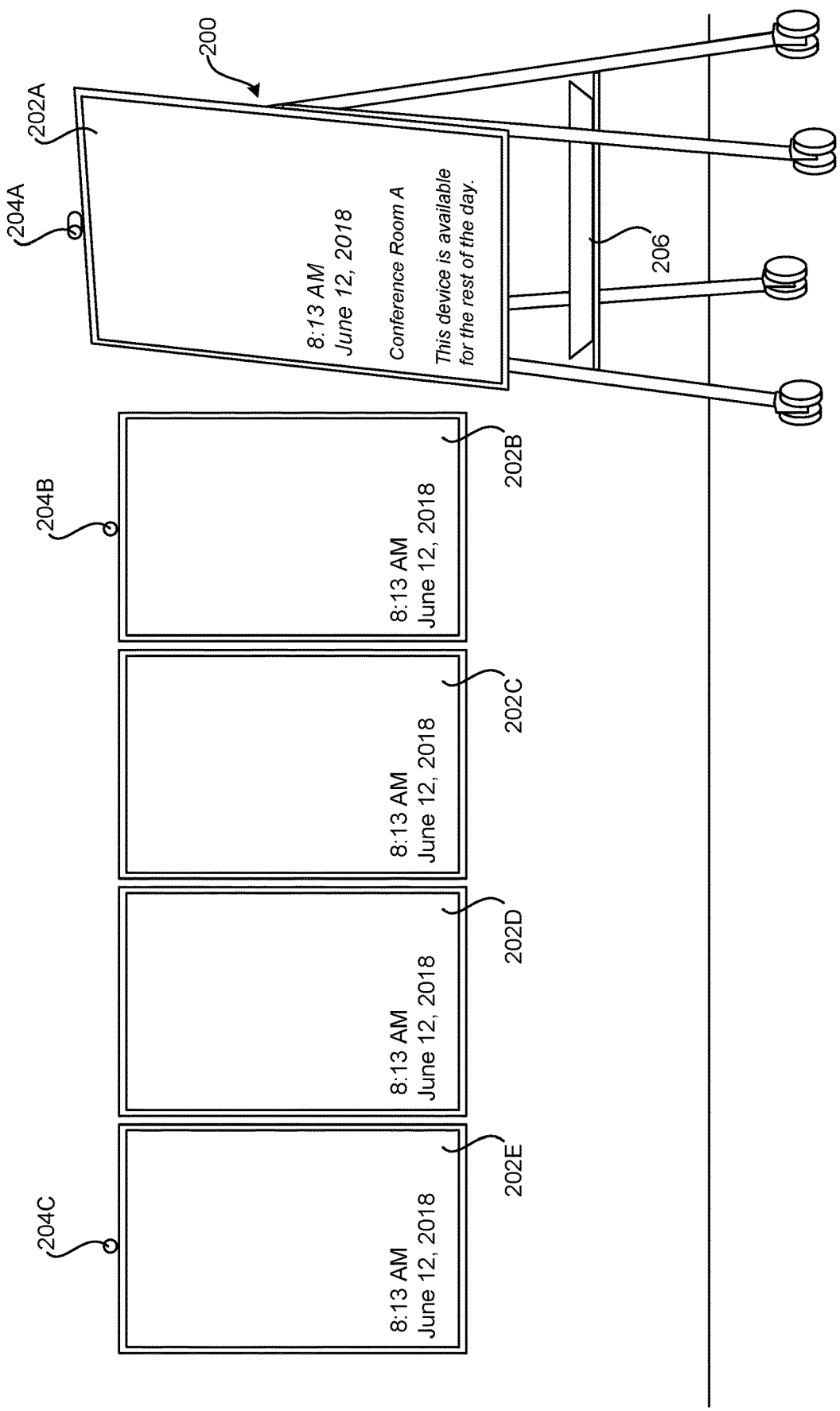
FIGS. 2A-2E are pictorial diagrams showing aspects of an interactive digital whiteboard configured for enforcement of role-based constraints on the modification of components.
Figure 2B:
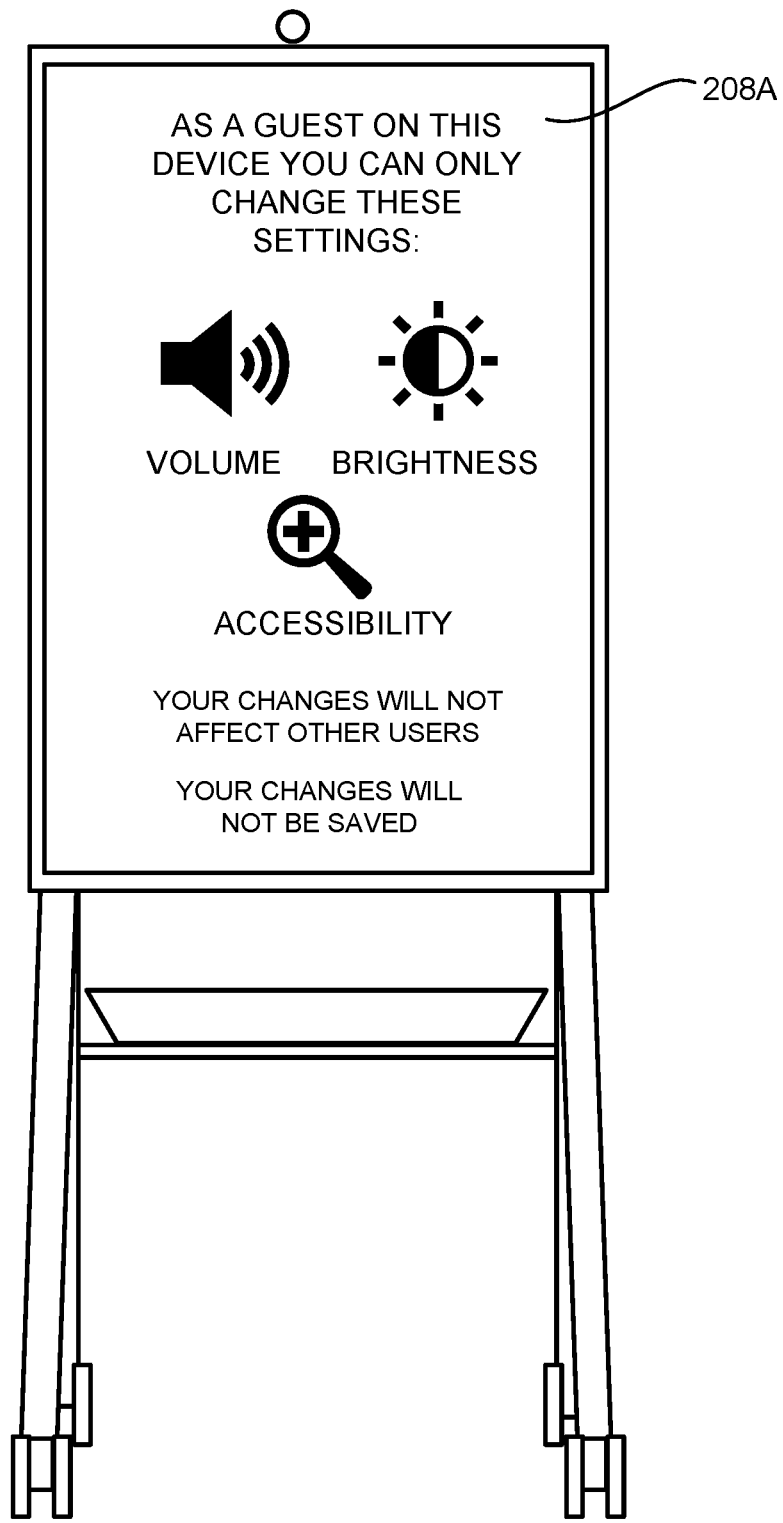

In the example illustrated in FIG. 2B, the interactive digital whiteboard 200 has detected a user in its vicinity. Because the detected user has not yet authenticated with the interactive digital whiteboard 200, the whiteboard 200 considers the user to be a guest user 108B. The guest user 108B might attempt to modify settings of the whiteboard 200 by executing the MUA settings application 104. In this case, the MUA settings application 104 can present the UI 208A to the guest user 108B.

The UI 208A shown in FIG. 2B shows UI controls corresponding to those configuration settings that the guest user 108B can change (i.e. the temporal settings 114), in this example brightness, volume, and accessibility settings. In this example, UI controls for configuration settings that the guest user 108B cannot change (i.e. the universal settings 110 and the global settings 112) are not presented in the UI 208A. However, UI controls for configuration settings that the guest user 108B cannot change (i.e. the universal settings 110 and the global settings 112) might be shown in the UI 208A in other configurations with visual attributes (e.g. grayed out) indicating that the settings cannot be modified.

If the guest user 108B requests to modify a configuration setting represented by one of the UI controls shown in the UI 208A (i.e. a temporal setting 114), the user will be permitted to make the modification. If the guest user 108B requests to modify a configuration setting not represented by one of the UI controls shown in the UI 208A (e.g. through the use of a hardware button or another UI), the user will not be permitted to make the modification. The UI 208A shown in FIG. 2B has been simplified for discussion purposes and might include additional information or be configured differently than that shown in FIG. 2B.

Figure 2C:
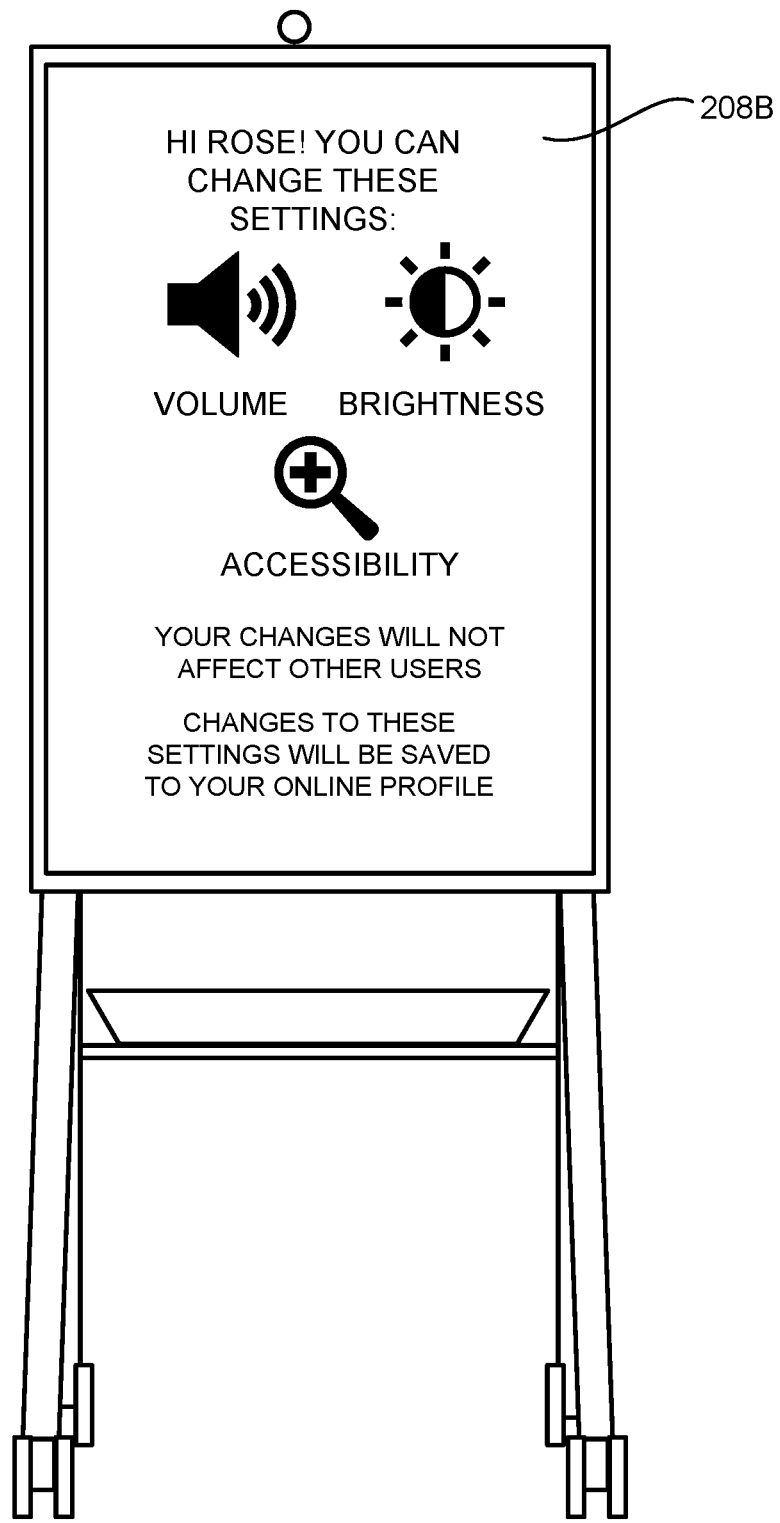

FIG. 2C continues the example from FIG. 2B, where the guest user 108B has authenticated with the whiteboard 200 and become an authenticated user 108C such as, for example, by placing a finger on a fingerprint reader on the side of the interactive digital whiteboard 200. As discussed above, values for some or all of the temporal settings 114 retrieved from a user profile 120 associated with the authenticated user 108C can also be applied to the whiteboard 200 when the user 108C is authenticated.

The guest user 108B might attempt to modify settings of the whiteboard 200 by executing the MUA settings application 104. In this case, the MUA settings application 104 can present the UI 208B to the authenticated user 108C. The UI 208B shown in FIG. 2C shows UI controls corresponding to configuration settings that the authenticated non-device-owner user 108C can change (i.e. the temporal settings 114), in this example brightness, volume, and accessibility settings.

In this example, UI controls for configuration settings that the authenticated user 108C cannot change (i.e. universal settings 110 or global settings 112) are not presented in the UI 208B. However, UI controls for configuration settings that the authenticated user 108C cannot change (i.e. universal settings 110 or global settings 112) might be shown in other configurations with attributes (e.g. grayed out) indicating that the settings cannot be modified.

If the authenticated user 108C requests to modify a configuration setting represented by one of the UI controls shown in the UI 208B, the authenticated user 108C will be permitted to make the modification. The authenticated user 108C can also modify the temporal settings 114 through the use of a hardware button or another UI. Changes to the temporal settings 114 can also be persisted to the user profile 120 associated with the authenticated user 108C.

If the non-device-owner authenticated user 108C attempts to modify a configuration setting not represented by one of the UI controls shown in the UI 208B (e.g. through the use of a hardware button or another UI), the authenticated user 108C will not be permitted to make the modification. The UI 208B shown in FIG. 2C has been simplified for discussion purposes and might include additional information or be configured differently than that shown in FIG. 2C.

As discussed briefly above, a user that has been assigned a role as a device owner 108A can authenticate with the interactive digital whiteboard 200 such as, for example, by placing a finger on a fingerprint reader on the side of the interactive digital whiteboard 200. When a device owner 108A authenticates with the whiteboard 200, some or all of the temporal settings 114 can be assigned values retrieved from a user profile 120 associated with the device owner 108A.

As also discussed briefly above, a device owner 108A can change both global settings 112 and temporal settings 114. For example, the device owner 108A might attempt to modify settings of the whiteboard 200 by executing the MUA settings application 104. In this case, the MUA settings application 104 can present the UI 208C shown in FIGS. 2D and 2E to the authenticated user 108A.

Figure 2D:
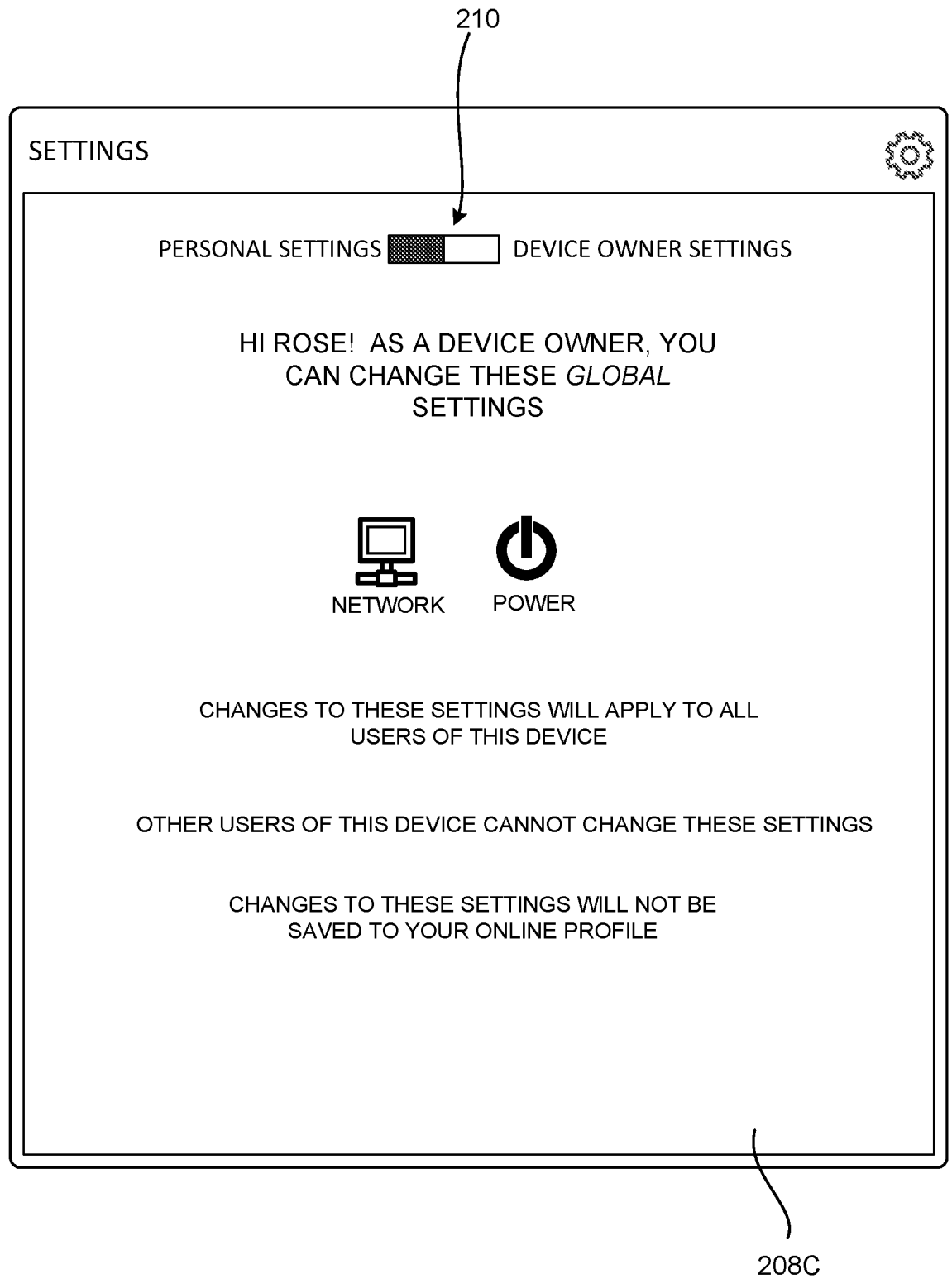

In one embodiment, the UI 208C is a single UI that enables a device owner 108A to modify both global settings 112 and temporal settings 114. In particular, the UI 208C can include a UI control 210 that enables the device owner 108A to switch between displays for setting global settings 112 (shown in FIG. 2D) and temporal settings 114 (shown in FIG. 2E). The display shown in FIG. 2D presents UI elements corresponding to the global settings 112. Selection of one of the UI elements will enable the device owner 108A to change the corresponding setting. As discussed above, changes to the global settings 112 made by a device owner 108A apply to all users of the MUA computing device 102. Changes to the global settings 112 made by a device owner are not persisted to the profile 120 associated with the device owner 108A.

Figure 2E:
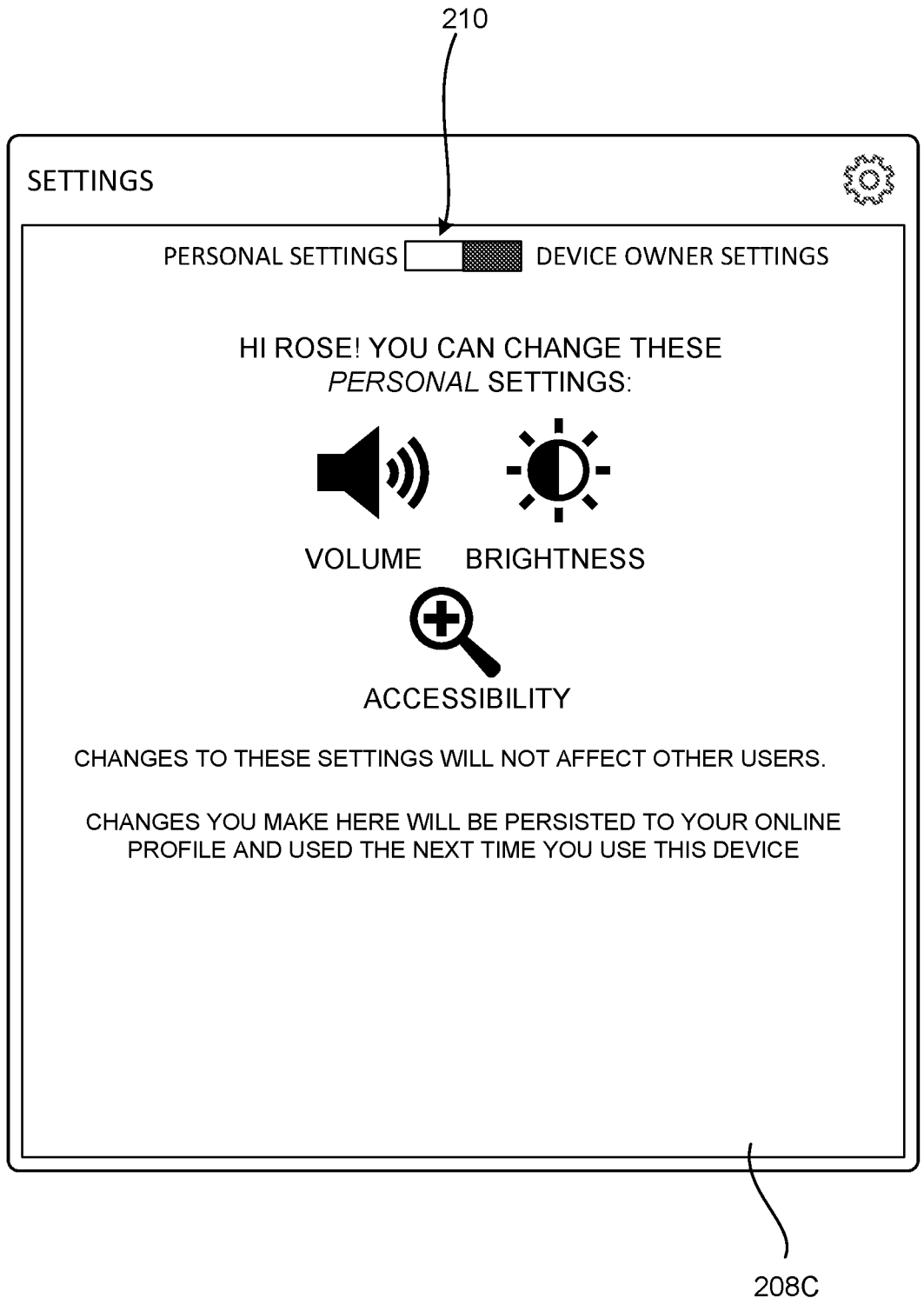

The device owner 108A can select the UI control 210 in order to view the display shown in FIG. 2E for changing the temporal settings 114. As in the examples described above, the display shown in FIG. 2E includes UI controls corresponding to temporal settings 114 that the device owner 108A can change, in this example brightness, volume, and accessibility settings.

If the device owner 108A requests to modify a configuration setting represented by one of the UI controls shown in FIG. 2E, the device owner 108A will be permitted to make the modification. The device owner 108A can also modify the temporal settings 114 through the use of a hardware button or another UI. Changes to the temporal settings 114 can also be persisted to the user profile 120 associated with the device owner 108A.

If the device owner 108A attempts to modify a configuration setting (e.g. a universal setting 110) not represented by one of the UI controls shown in the UI 208C (e.g. through the use of a hardware button or another UI), the device owner 108A will not be permitted to make the modification. The UI 208C shown in FIGS. 2D and 2E has been simplified for discussion purposes and might include additional information or be configured differently than that shown in the FIGS.

Figure 3A:
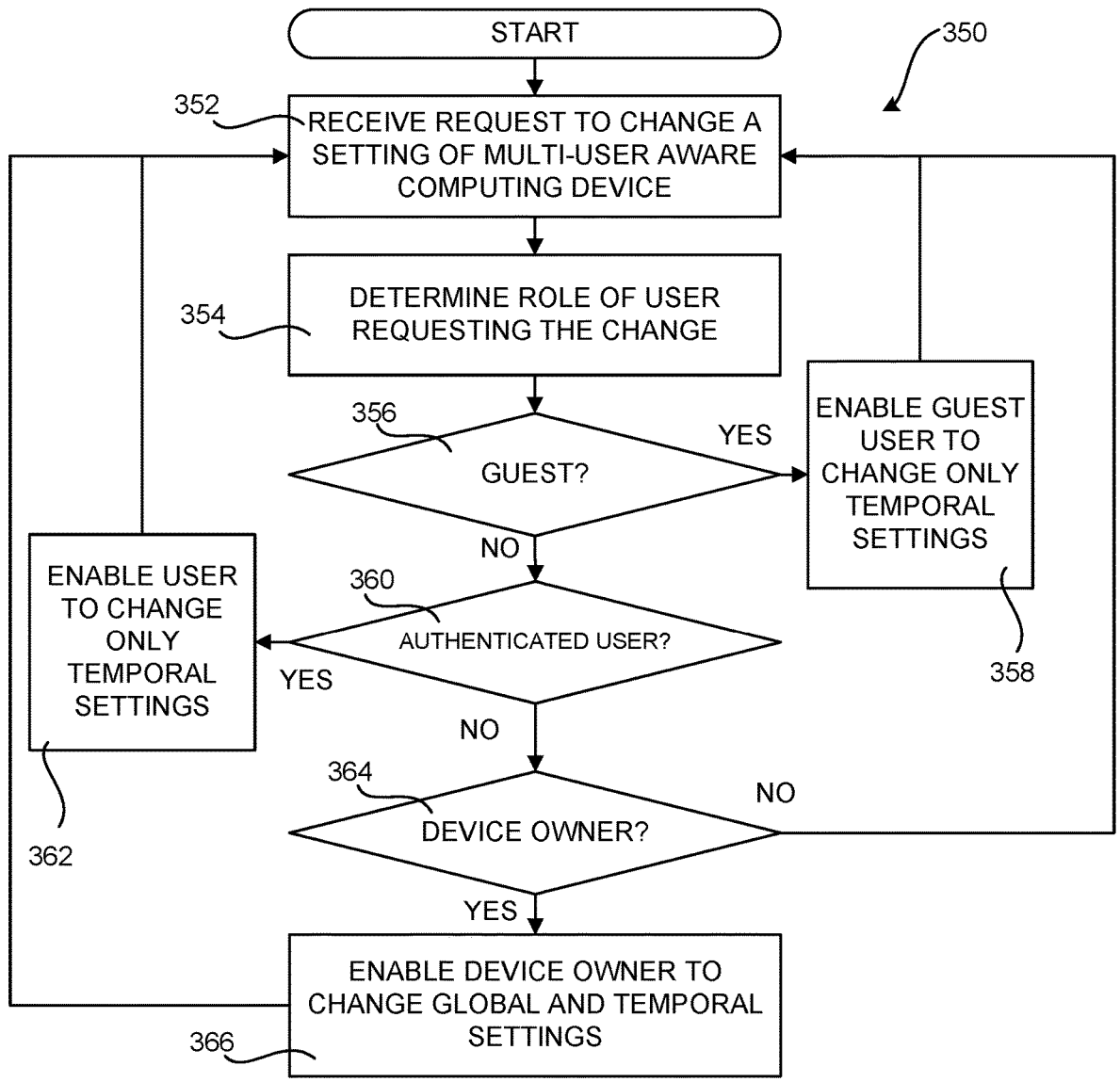
FIGS. 3A and 3B are flow diagrams showing routines that illustrate aspects of the operation of the MUA computing device described with reference to FIGS. 1A-2E for enforcement of role-based constraints.
Figure 3B:
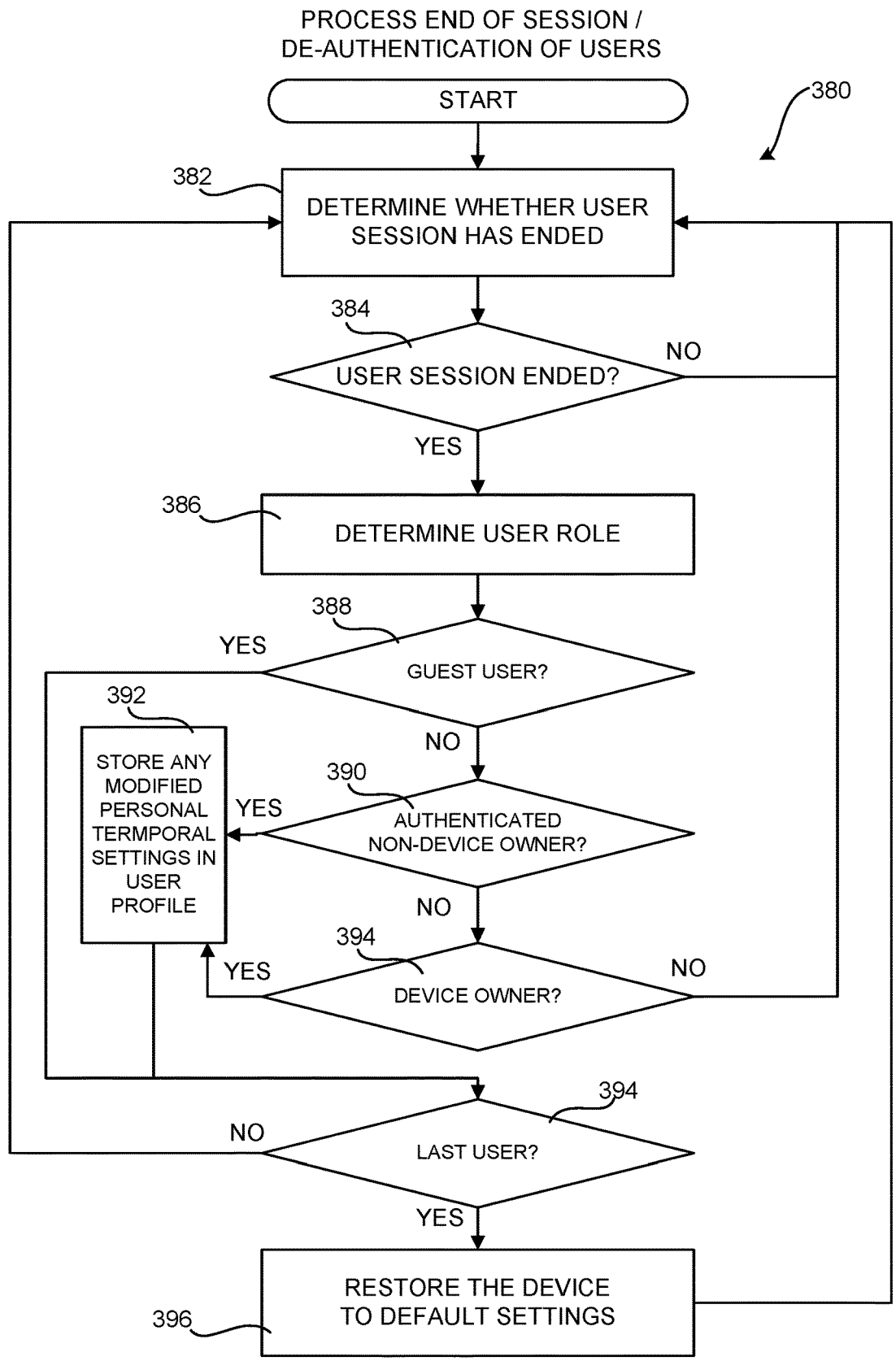

FIGS. 3A and 3B are flow diagrams showing routines 350 and 380, respectively, that illustrate aspects of the operation of the MUA computing device 102 described above with reference to FIGS. 1A-2E. It should be appreciated that the logical operations described herein with regard to FIGS. 3A and 3B, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 350 shown in FIG. 3A illustrates aspects of the MUA computing device 102 for enabling users 108 to modify settings of a MUA computing device 102. The routine 350 begins at operation 352, where the MUA computing device 102 receives a request from a user 108 to change a setting of the device 102. The routine 350 then proceeds from operation 352 to operation 354, where the MUA computing device 102 determines the role 106 of the current user. If the current user is a guest user 108B, the routine 350 proceeds from operation 356 to operation 358, where the MUA computing device 102 enables the guest user 108B to change only temporal settings 114. The routine 350 then proceeds from operation 358 back to operation 352.

If, at operation 356, the MUA computing device 102 determines that the role 106 of the current user is not a guest user 108B, the routine 350 proceeds from operation 356 to operation 360. At operation 360, the MUA computing device 102 determines if the current user 108 is a non-device-owner authenticated user 108C. If the current user is an authenticated user 108C, the routine 350 proceeds from operation 360 to operation 362, where the authenticated user 108C is permitted to change only temporal settings 114. The routine 350 then proceeds from operation 362 back to operation 352.

If, at operation 360, the MUA computing device 102 determines that the role 106 of the current user is not an authenticated user 108C, the routine 350 proceeds from operation 360 to operation 364. At operation 364, the MUA computing device 102 determines if the current user 108 is a device owner 108A. If the current user is a device owner 108A, the routine 350 proceeds from operation 364 to operation 366, where the device owner 108A is permitted to change the temporal settings 114 and the global settings 112. The routine 350 then proceeds from operation 366 back to operation 352 where the process described above can be repeated for additional user requests to change configuration settings of the MUA computing device 102.

The routine 380 shown in FIG. 3B illustrates aspects of the MUA computing device 102 for handling the de-authentication of users or the end of a user session where no users remain using the device 102. The routine 380 begins at operation 382, where the MUA computing device 102 determines whether a user 108 has ended their session with the MUA computing device 102. For example, the MUA computing device 102 might determine whether a user has expressly de-authenticated, such as by signing out, or has been automatically de-authenticated, such as by leaving the vicinity of the MUA computing device 102.

If the MUA computing device 102 determines that a user session has ended, the routine 380 proceeds from operation 384 to operation 386, where the MUA computing device 102 determines the user role 106 of the user 108 whose session has ended. If the user role 106 indicates that the user was a guest user 108B, the routine 380 proceeds from operation 388 to operation 394, described below.

If the user role 106 indicates that the de-authenticated user was an authenticated non-device-owner user 108C, the routine 380 proceeds from operation 390 to operation 392 where changes to any temporal settings 114 made by the user can be stored in the user profile 120 associated with the user 108C. The routine 380 then proceeds from operation 392 to operation 394, described below.

If the user role 106 indicates that the de-authenticated user was a device owner 108A, the routine 380 proceeds from operation 394 to operation 392, where any temporal settings 114 changed by the device owner 108A can be stored in the user profile 120 associated with the device owner 108A. Changes to global settings 110 made by a device owner 108A can be stored in an appropriate location, such as in a data store on the computing device 102, at the time the changes are made. The routine 380 then proceeds from operation 392 to operation 394.

At operation 394, the MUA computing device 102 determines whether the de-authenticated user was the last user in the user session. If not, the routine 380 proceeds from operation 394 back to operation 382, where the de-authentication of addition users 108 can be processed. If the de-authenticated user was the last user of the MUA computing device 102, the routine 380 proceeds from operation 394 to operation 396, where the MUA computing device 102 is configured with default values for the temporal settings 114 to place the MUA computing device 102 in a known state prior to the next user session. Changes made to the temporal settings 114 by guest users are discarded. The routine 380 proceeds from operation 396 back to operation 382, described above.

Figure 4:
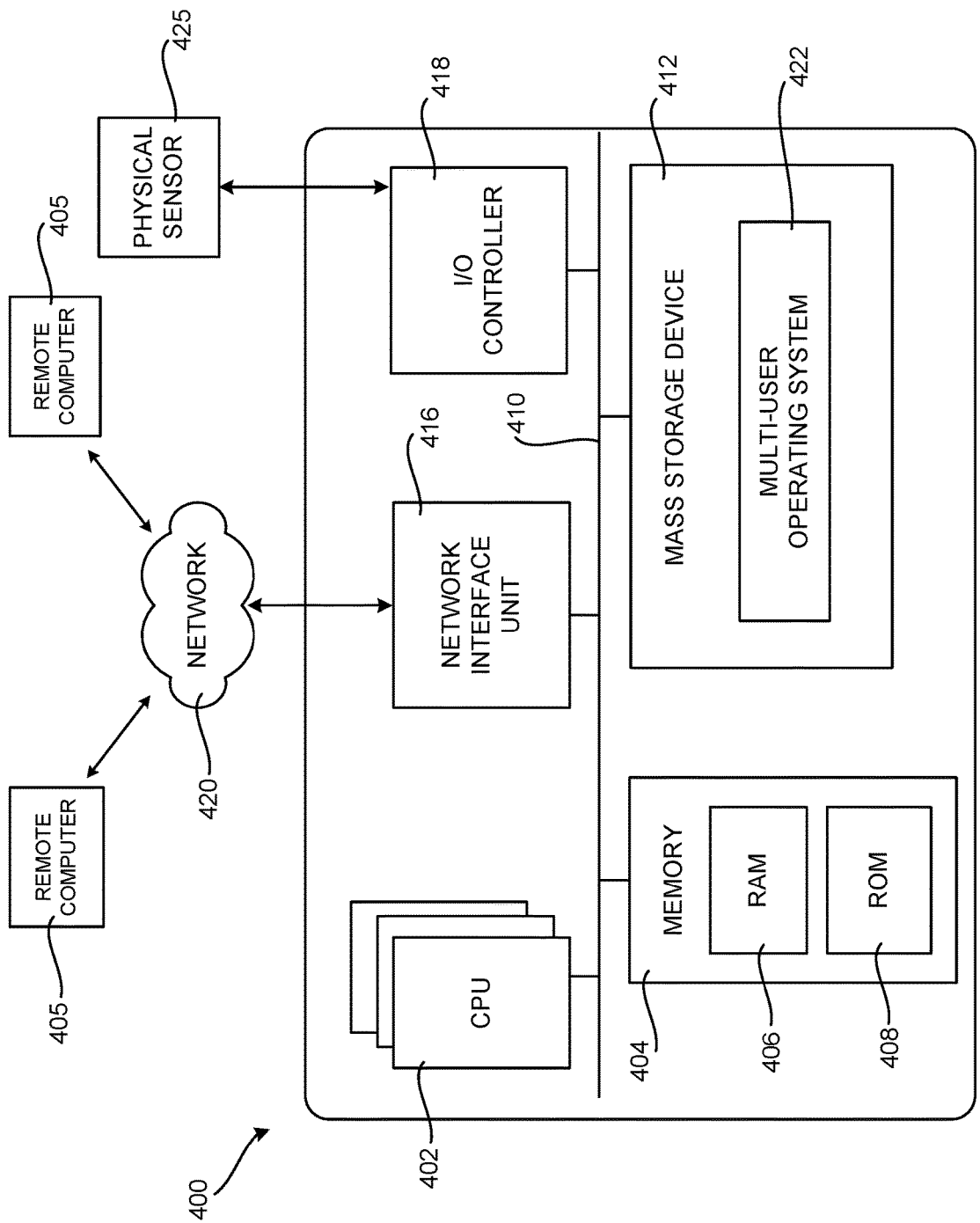
FIG. 4 is a computer architecture diagram showing an illustrative computer hardware and software architecture for a computing device that can implement aspects of the technologies presented herein.

FIG. 4 is a computer architecture diagram showing an illustrative computer hardware and software architecture for a computing device that can implement the various technologies presented herein. In particular, the architecture illustrated in FIG. 4 can be utilized to implement a MUA computing device 102 such as an interactive digital whiteboard 200, server computer, mobile phone, e-reader, smartphone, desktop or laptop computer, AR/VR device, tablet computer, video game console, or another type of MUA computing device.

The computer 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, can be stored in the ROM 408. The computer 400 further includes a mass storage device 412 for storing a MUA operating system 422, application programs, such as single user aware applications (not shown), MUA applications (not shown), and other types of programs. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 420. The computer 400 can connect to the network 420 through a network interface unit 416 connected to the bus 410. It should be appreciated that the network interface unit 416 can also be utilized to connect to other types of networks and remote computer systems. The computer 400 can also include an input/output controller 418 for receiving and processing input from a number of other devices, including a keyboard, mouse, touch input, an electronic stylus (not shown in FIG. 4), or a physical sensor such as a video camera or fingerprint reader. Similarly, the input/output controller 418 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
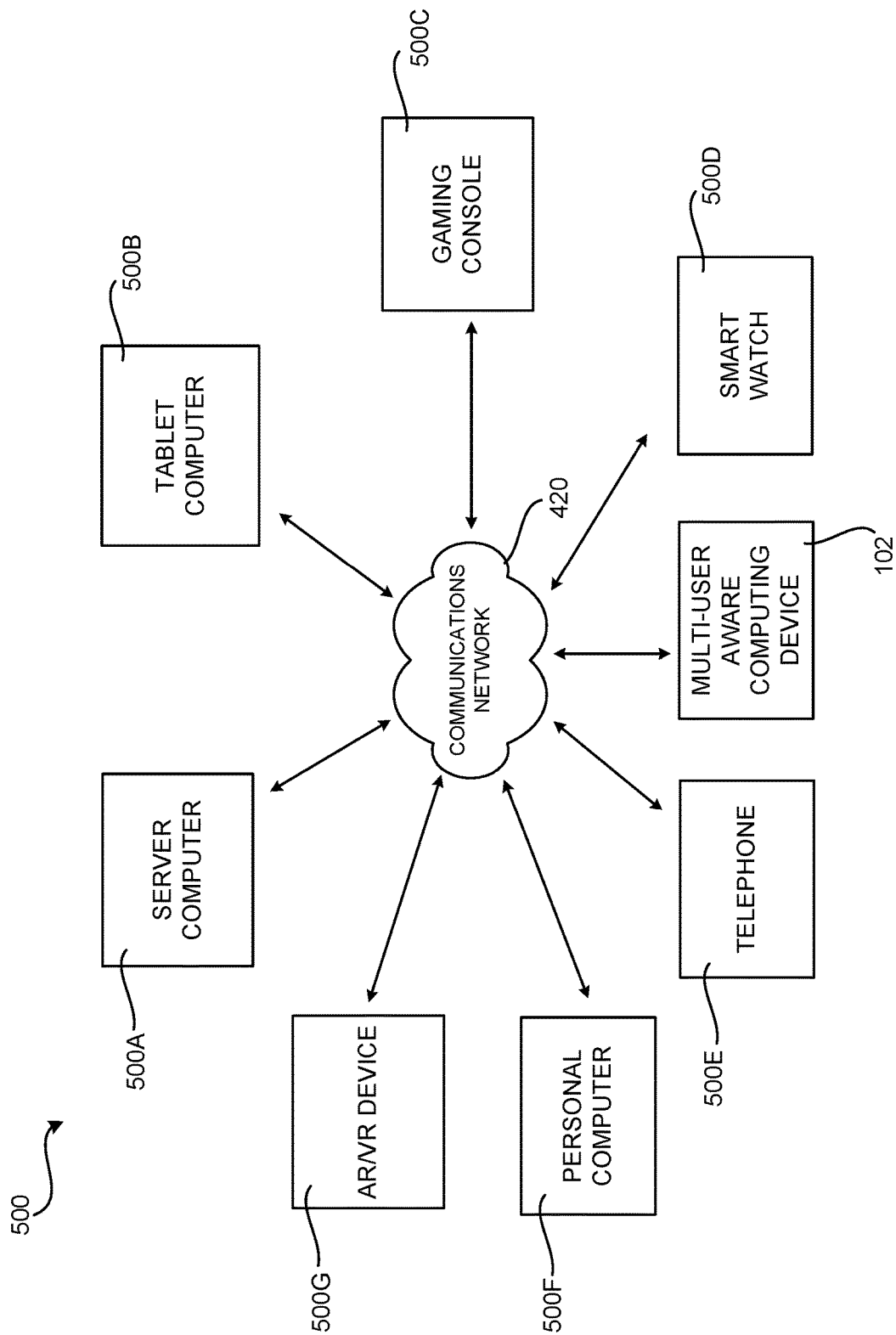
FIG. 5 is a network diagram illustrating a distributed computing environment in which aspects of the disclosed technologies can be implemented.

FIG. 5 is a network diagram illustrating a distributed network computing environment 500 in which aspects of the disclosed technologies can be implemented, according to various embodiments presented herein. As shown in FIG. 5, one or more server computers 500A can be interconnected via a communications network 420 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a MUA computing device 102, server computer 500A, tablet computer 500B, gaming console 500C, smartwatch 500D, telephone 500E, such as a smartphone, a personal computer 500F, and an AR/VR device 500G.

In a network environment in which the communications network 420 is the Internet, for example, the server computer 500A can be a dedicated server computer operable to process and communicate data to and from the client computing devices 500B-500G and the MUA computing device 102 via any of a number of known protocols, such as, hypertext transfer protocol ("HTTP"), file transfer protocol ("FTP"), or simple object access protocol ("SOAP"). Additionally, the networked computing environment 500 can utilize various data security protocols such as secured socket layer ("SSL") or pretty good privacy ("PGP"). Each of the client computing devices 500B-500G and the MUA computing device 102 can be equipped with an operating system operable to support one or more computing applications or terminal sessions such as a web browser (not shown in FIG. 5), or other graphical user interface (not shown in FIG. 5), or a mobile desktop environment (not shown in FIG. 5) to gain access to the server computer 500A.

The server computer 500A can be communicatively coupled to other computing environments (not shown in FIG. 5) and receive data regarding a participating user's interactions/resource network. In an illustrative operation, a user (not shown in FIG. 5) may interact with a computing application running on a client computing device 500B-500G or the MUA computing device 102 to obtain desired data and/or perform other computing applications.

The data and/or computing applications may be stored on the server 500A, or servers 500A, and communicated to cooperating users through the client computing devices 500B-500G or the MUA computing device 102 over an exemplary communications network 420. A participating user (not shown in FIG. 5) may request access to specific data and applications housed in whole or in part on the server computer 500A. These data may be communicated between the client computing devices 500B-500G and the MUA computing device 102 and the server computer 500A for processing and storage.

The server computer 500A can host computing applications, processes and applets for the generation, authentication, encryption, and communication of data and applications, and may cooperate with other server computing environments (not shown in FIG. 5), third party service providers (not shown in FIG. 5), network attached storage ("NAS") and storage area networks ("SAN") to realize application/data transactions.

It should be appreciated that the computing architecture shown in FIG. 4 and the distributed network computing environment shown in FIG. 5 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: configuring a multi-user aware (MUA) computing device with universal settings not modifiable by users of the MUA computing device, global settings modifiable by users of the MUA computing device having an assigned role of device owner, and temporal settings modifiable by all users of the MUA computing device; receiving a request from a user of the MUA computing device to change a configuration setting of the MUA computing device; responsive to receiving the request, determining a role associated with the user; granting the request to change to the configuration setting of the MUA computing device if the role indicates the user is a device owner and the setting comprises one of the global settings or one of the temporal settings; and denying the request to change to the configuration setting of the MUA computing device if the role indicates the user is not a device owner and the setting comprises one of the global settings or one of the universal settings.

Clause 2. The computer-implemented method of clause 1, wherein the universal settings are defined by a policy.

Clause 3. The computer-implemented method of any of clauses 1 and 2, further comprising storing data identifying the change to the configuration setting in a profile associated with the user if the setting comprises one or the temporal settings and the role indicates the user is not a guest user of the MUA computing device.

Clause 4. The computer-implemented method of any of clause 1-3, further comprising providing a single user interface (UI) for changing the global settings and for changing the temporal settings if the role indicates the user is a device owner.

Clause 5. The computer-implemented method of any of clauses 1-4, wherein the single UI comprises UI elements corresponding only to the global settings and temporal settings modifiable by the user.

Clause 6. The computer-implemented method of any of clauses 1-5, further comprising providing a single user interface (UI) for changing only the temporal settings if the role indicates the user is not a device owner.

Clause 7. The computer-implemented method of any of clauses 1-6, wherein the UI comprises UI elements corresponding only to temporal settings modifiable by the user.

Clause 8. A computing device comprising: one or more processors; and at least one computer storage medium having computer executable instructions stored thereon which, when executed by the one or more processors, cause the computing device to: configure the computing device in a configuration defined by universal settings, global settings, and temporal settings; restrict users of the computing device that do not have an associated device owner role from modifying the global settings; enable all users of the computing device to modify the temporal settings; and restrict all users of the computing device from modifying the universal settings.

Clause 9. The computing device of clause 8, wherein the at least one computer storage medium has further computer executable instructions stored thereon to provide a user interface (UI) through which a user having an associated device owner role can modify the global settings and the temporal settings.

Clause 10. The computing device of any of clauses 8 and 9, wherein the UI comprises a single UI for modifying the global settings and the temporal settings, and wherein the UI comprises elements corresponding only to the global settings and temporal settings modifiable by the user.

Clause 11. The computing device of any of clauses 8-10, wherein the at least one computer storage medium has further computer executable instructions stored thereon to provide a user interface (UI) through which a user not having an associated device owner role can modify only the temporal settings.

Clause 12. The computing device of any of clauses 8-11, wherein the UI comprises UI elements corresponding only to temporal settings modifiable by the user.

Clause 13. The computing device of any of clauses 8-12, wherein the universal settings are defined by a policy.

Clause 14. The computing device of any of clauses 8-13, wherein the at least one computer storage medium has further computer executable instructions stored thereon to configure the MUA computing device with default values for the temporal settings following a user session with the MUA computing device.

Clause 15. The computing device of any of clauses 8-14, wherein the at least one computer storage medium has further computer executable instructions stored thereon to persist changes to the temporal settings made by an authenticated user of the computing device to a user profile associated with the user and to discard changes to the temporal settings made by a guest user of the computing device.

Clause 16. At least one computer storage medium having computer executable instructions stored thereon which, when executed by one or more processors, cause a multi-user aware (MUA) computing device to: receive a request from a user of the MUA computing device to change a component of the MUA computing device; responsive to receiving the request, determine a role associated with the user; apply the requested change to the component of the MUA computing device if the role indicates the user is an authenticated user of the MUA computing device and the component comprises a component modifiable by authenticated users of the MUA computing device; and apply the requested change to the component of the MUA computing device if the role indicates the user is a guest user of the MUA computing device and component comprises a component modifiable by guest users of the MUA computing device.

Clause 17. The at least one computer storage medium of clause 16, wherein the component comprises a configuration setting of the MUA computing device.

Clause 18. The at least one computer storage medium of any of clauses 16 and 17, having further computer executable instructions stored thereon to: not apply the requested change to the component of the MUA computing device if the role indicates the user is an authenticated user of the MUA computing device and the component comprises a component that is not modifiable by authenticated users of the MUA computing device.

Clause 19. The at least one computer storage medium of any of clauses 16-18, having further computer executable instructions stored thereon to: not apply the requested change to the component of the MUA computing device if the role indicates that the user is a non-authenticated user of the MUA computing device and the component comprises a component that is not modifiable by the guest users of the computing device.

Clause 20. The at least one computer storage medium of any of clauses 16-19, having further computer executable instructions stored thereon to: provide a user interface (UI) for defining components of the MUA computing device that are modifiable by authenticated or non-authenticated users of the MUA computing device; and provide a UI for defining components of the MUA computing device that are modifiable only by users of the MUA computing device having an associated device owner role.

Based on the foregoing, it should be appreciated that technologies for enforcement of role-based constraints on the modification of components of a MUA computing device have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
    configuring a multi-user aware (MUA) computing device with universal settings not modifiable by users of the MUA computing device, global settings modifiable by users of the MUA computing device having an assigned role of device owner, and temporal settings modifiable by all users of the MUA computing device;
    receiving a request from a user of the MUA computing device to change a configuration setting of the MUA computing device;
    responsive to receiving the request, determining a role associated with the user;
    granting the request to change to the configuration setting of the MUA computing device if the role indicates the user is a device owner and the setting comprises one of the global settings or one of the temporal settings; and
    denying the request to change to the configuration setting of the MUA computing device if the role indicates the user is not a device owner and the setting comprises one of the global settings or one of the universal settings.

2. The computer-implemented method of claim 1, wherein the universal settings are defined by a policy.

3. The computer-implemented method of claim 1, further comprising storing data identifying the change to the configuration setting in a profile associated with the user if the setting comprises one of the temporal settings and the role indicates the user is not a guest user of the MUA computing device.

4. The computer-implemented method of claim 1, further comprising providing a single user interface (UI) for changing the global settings and for changing the temporal settings if the role indicates the user is a device owner.

5. The computer-implemented method of claim 4, wherein the single UI comprises UI elements corresponding only to the global settings and temporal settings modifiable by the user.

6. The computer-implemented method of claim 1, further comprising providing a single user interface (UI) for changing only the temporal settings if the role indicates the user is not a device owner.

7. The computer-implemented method of claim 6, wherein the UI comprises UI elements corresponding only to temporal settings modifiable by the user.

8. A computing device comprising:
    one or more processors; and
    at least one computer storage medium having computer executable instructions stored thereon which, when executed by the one or more processors, cause the computing device to:
        configure the computing device in a configuration defined by universal settings, global settings, and temporal settings;
        restrict users of the computing device that do not have an associated device owner role from modifying the global settings;
        enable all users of the computing device to modify the temporal settings; and
        restrict all users of the computing device from modifying the universal settings.

9. The computing device of claim 8, wherein the at least one computer storage medium has further computer executable instructions stored thereon to provide a user interface (UI) through which a user having an associated device owner role can modify the global settings and the temporal settings.

10. The computing device of claim 9, wherein the UI comprises a single UI for modifying the global settings and the temporal settings, and wherein the UI comprises elements corresponding only to the global settings and temporal settings modifiable by the user.

11. The computing device of claim 8, wherein the at least one computer storage medium has further computer executable instructions stored thereon to provide a user interface (UI) through which a user not having an associated device owner role can modify only the temporal settings.

12. The computing device of claim 10, wherein the UI comprises UI elements corresponding only to temporal settings modifiable by the user.

13. The computing device of claim 8, wherein the universal settings are defined by a policy.

14. The computing device of claim 8, wherein the at least one computer storage medium has further computer executable instructions stored thereon to configure the MUA computing device with default values for the temporal settings following a user session with the MUA computing device.

15. The computing device of claim 8, wherein the at least one computer storage medium has further computer executable instructions stored thereon to persist changes to the temporal settings made by an authenticated user of the computing device to a user profile associated with the user and to discard changes to the temporal settings made by a guest user of the computing device.

16. At least one non-transitory computer storage medium having computer executable instructions stored thereon which, when executed by one or more processors, cause a multi-user aware (MUA) computing device to:
receive a request from a user of the MUA computing device to change a component of the MUA computing device;
responsive to receiving the request, determine a role associated with the user;
apply the requested change to the component of the MUA computing device if the role indicates the user is an authenticated user of the MUA computing device and the component comprises a component modifiable by authenticated users of the MUA computing device; and
apply the requested change to the component of the MUA computing device if the role indicates the user is a guest user of the MUA computing device and the component comprises a component modifiable by guest users of the MUA computing device.

17. The at least one non-transitory computer storage medium of claim 16, wherein the component comprises a configuration setting of the MUA computing device.

18. The at least one non-transitory computer storage medium of claim 16, having further computer executable instructions stored thereon to:
not apply the requested change to the component of the MUA computing device if the role indicates the user is an authenticated user of the MUA computing device and the component comprises a component that is not modifiable by authenticated users of the MUA computing device.

19. The at least one non-transitory computer storage medium of claim 16, having further computer executable instructions stored thereon to:
not apply the requested change to the component of the MUA computing device if the role indicates that the user is a non-authenticated user of the MUA computing device and the component comprises a component that is not modifiable by the guest users of the computing device.

20. The at least one non-transitory computer storage medium of claim 16, having further computer executable instructions stored thereon to:
provide a user interface (UI) for defining components of the MUA computing device that are modifiable by authenticated or non-authenticated users of the MUA computing device; and
provide a UI for defining components of the MUA computing device that are modifiable only by users of the MUA computing device having an associated device owner role.

* * * * *